Nov. 17, 1970  R. E. DARBO  3,540,292
APPARATUS AND METHOD FOR CONTROLLING PRESSURE IN
A CONSTANT VOLUME ENVIRONMENT
Filed Oct. 14, 1968

INVENTOR
ROLF E. DARBO

BY

ATTORNEY

United States Patent Office 3,540,292
Patented Nov. 17, 1970

3,540,292
APPARATUS AND METHOD FOR CONTROLLING PRESSURE IN A CONSTANT VOLUME ENVIRONMENT
Rolf E. Darbo, P.O. Box 2158, Madison, Wis. 53701
Filed Oct. 14, 1968, Ser. No. 777,954
Int. Cl. G01n 7/00
U.S. Cl. 73—64.2                                     7 Claims

ABSTRACT OF THE DISCLOSURE

Apparatus and method for effecting continuous and precisely variable pressure control in a rigidly enclosed and isolated fluid environment for determining reversible effects of pressure on physical, chemical or biological phenomena wherein a sealable constant volume chamber is provided with a liquid phase and a gaseous phase disposed therein with a discrete portion of the gaseous phase being subject to controlled variation in elevation with respect to the liquid phase as a result of chamber configuration and manipulability.

---

This invention relates to constant volume apparatus for containing and isolating liquids and to a method for precisely and reversibly controlling continuously variable pressure throughout a predetermined range of pressures in such apparatus for the purpose of analyzing physical, chemical, or biological change which occur in response to change in environmental fluid pressure, and more particularly relates to a device and method for determining equilibrium changes for fluid systems and organisms therein as a function of pressure, examples of such apparatus and its use being an analyzer for determining component fractions of low boiling ingredients in gasoline, and apparatus for determining pressure-solubility relationships for fluid mixtures.

It is an object of this invention to provide a rigidly enclosed and isolated vessel with means for providing variable fluid pressure therein.

It is another object of this invention to provide apparatus for determining and identifying component fractions of ingredients in gasoline.

It is another object of this invention to provide apparatus for providing controlled pressure environment for marine organisms.

Other objects will become apparent from the following detailed description and from the accompanying drawings in which like numerals refer to like parts and in which.

Figure 1:
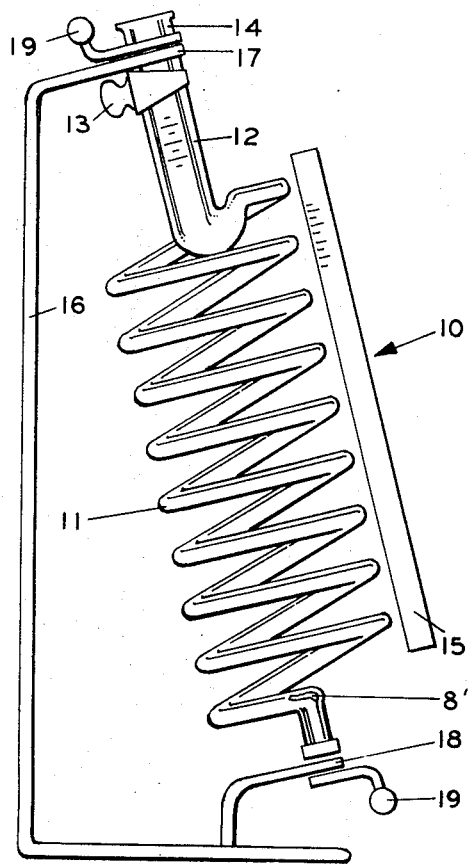
FIG. 1 is an elevation of a preferred embodiment of a controlled pressure, constant volume apparatus of this invention.

Referring now to FIG. 1, glass apparatus 10 comprises a helically configured lower body portion 11 and a volumetrically calibrated neck portion 12 disposed with coincident axes. Stopcock 13 is provided at the top of the neck portion 12 to seal filling mouth 14 when the device has been properly filled with fluid preparatory to use. A vertical scale 15 calibrated for elevation is disposed immediately adjacent helical portion 11 in a plane bounded by the axis of the helix and a vertical which intersects the axis at the base of the helix. Means for rotating apparatus 10 in standard 16 comprising upper and lower bearings 17 and 18 respectively may be provided, either a manually operated crank arm 19 as shown or motor driving means may be used. In operation, helical portion 11 is filled with mercury to level A as shown.

Gaseous bubble 8' is placed in the mercury either before or after filling of the apparatus with mercury, and the bubble can comprise an impermeable membrane envelope which is readily expansible, such as one of rubber, or pleated metal foil or cellophane, etc. The membrane must be responsive to infinitesimally small changes in fluid pressure, and it is preferred to eliminate such a membrane by using mannually insoluble and nonwettable fluids such as an air bubble in liquid mercury. Any suitable gaseous state fluid may be used in place of air and in some instances a condensible gas such as butane may be preferred. A precise measurement of bubble 8' must be made repeatedly during analytic determinations and it is possible to provide an optical magnifying means in conjunction with scale 15 and/or a calibrated slidably mounted device to facilitate measurement, however such means are not illustrated and a simple caliper can be used for the purpose in the embodiment of FIG. 1. Bubble 8' is of such size as to completely fill the cross-section of the bore in portion 11 of apparatus 10 at any position therein, however, the bore is not of such small size so that movement of the bubble therethrough is measureably affected by the effects of surface tension. The desired relationship of bore, bubble and measuring means is similar to that found in a builder's level. The length of bubble 8' at any given temperature and elevation as read on scale 15 is a parameter of the fluid pressure extered on bubble 8'. When mercury and bubble 8' have been charged to apparatus 10, a quantity of fluid to be analyzed, if insoluble in mercury and not a solvent for mercury such as for example gasoline, can be charged into calibrated neck portion 12 to either fill or partially fill the neck portion to a desired calibration mark and stopcock 13 can be closed to seal apparatus 10. If the fluid being charged is not compatible for use in contact with mercury either because of physical or chemical interaction or because of contamination, then a loosely fitted membrane should be interposed between the sample receiving chamber and the mercury in apparatus 10 to prevent the two fluids from being in contact. A temperature reading for the fluids in apparatus 10 can be made, or preferably apparatus 10 can be immersed in a water bath to achieve a desired temperature which will remain steady during the ensuing procedure. The configuration and disposition of apparatus 10 is such that the helical pitch of portion 11 relative to the angle of inclination of the axis of portion 11 from vertical causes points of maximum elevation in the bore of the helix to be maximum in a plane bounded by the axis of the helix and a vertical intersecting the axis at the base of the apparatus, said points of maximum elevation being defined as being more elevated than adjacent points in contiguous portions of the bore, the result that bubble 8' can be caused to traverse the length of the helical bore either to an increased elevation or to a decreased elevation simply by rotating apparatus 10 with crank arm 19 in the direction required. For purposes of illustration, for an observer facing the top of apparatus 10, crank arm 19 will be rotated counterclockwise to cause bubble 8' to traverse the length of the bore of helical portion 11 from a higher elevation to the base of the apparatus, and conversely, crank arm will be rotated clockwise to cause bubble 8' to traverse the bore of portion 11 upwardly from a lower elevation. Standard 16 is configured to maintain the correct inclination from vertical for portion 11, and the upper portion of the helix is provided with a conventional liquid "trap" to prevent escape of bubble 8' although such configuration is unnecessary if a membrane is provided between portions 11 and 12 as above described.

The volume of bubble 8' anywhere in the bore of helical portion 11 is determinable by measuring the length of bubble 8′, the bubble being of size sufficient to fill the cross-sectional area of the bore, which may be assumed to be of substantially uniform diameter, so that the volume of the bubble anywhere in the bore is directly linearly proportional to its length. Assuming the validity of the ideal gas law and the condition of constant temperature, the total fluid pressure on the bubble will be inversely linearly proportional to its volume and correspondingly to its length, and further when the elevation of the bubble in portion 11 is determined by reading scale 15 the partial component pressure of the hydrostatic head of mercury will be known together with that of the sample so that any differential pressure between a calibrated standard and the sample unknown will be a direct measure of differential vapor pressure between the control standard and the unknown. The assumed conditions will be substantially eliminated when scale 15 is graduated by empirical measurement of bubble 8′ using known standards, and may be calibrated directly in vapor pressure, or if the identity of the vapor composition is known, may be calibrated directly in component fraction of a known ingredient in a sample, for example if cold weather gasoline formulations are analyzed with butane added for ease in starting a cold motor, scale 15 may read in butane fraction in gasoline. A multitude of scales 15 may be provided for use with apparatus 10 each applicable to a different substance or formulation of substances. It will be recognized that sample taking procedures must be specified for accurate and reproducible results to be achieved for multi-component substances because the more volatile components will be lost from the sample if it is unconfined before being sealed in apparatus 10. Each individual apparatus should be provided with scales 15 which are empirically determined with a particular piece of equipment for greatest accuracy to be achieved.

Figure 2:
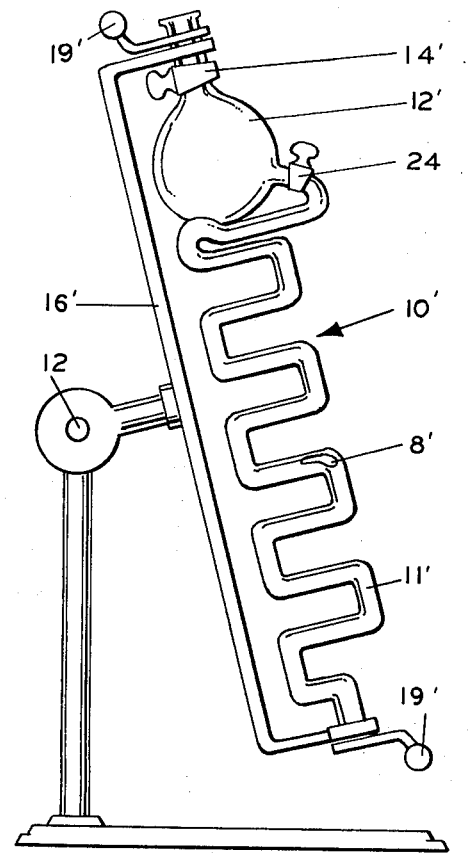
FIG. 2 is an elevation of another embodiment of the apparatus of FIG. 1.

In FIG. 2 is shown a modified embodiment of the apparatus of FIG. 1 comprising crenelate configured lower portion 11′ of apparatus 10′. Apparatus 10′ is pivotally and rotatably mounted by pivotal means 21 for operable movement about a horizontal axis to angles of inclination on either side of vertical to cause bubble 8′ to move upward from one crenel to the next higher one or alternatively by apparatus 10′ being incrementally rotated in 180 degree increments by means of crank arm 19′ in the manner described for FIG. 1 to cause bubble 8′ to move upward, and conversely bubble 8′ may be caused to traverse the bore of the apparatus from neck 12′ to the base by apparatus 10′ being inverted by 180 degree rotation about pivot 21 and the described procedure being repeated. A graduated scale similar to scale 15 of FIG. 1 can be provided for reading both the relative elevation and the length of bubble 8′ simultaneously and would be aligned vertically with apparatus 10′ being brought into vertical superimposed alignment for reading. As will be apparent a vernier can be provided on scale means in well known manner to facilitate measuring the length of bubble 8′ with a high degree of accuracy. Such scale means and attachments are not shown in the interest of clarity of illustration. Stopcock 24 is provided at the base of neck portion 12′ for preventing mercury from being lost from the apparatus when the device is in inverted position or when sample specimens are changed. Neck portion 12′ is shown as bulbously configured for the purpose of providing a suitable chamber in which water samples containing aquatic plants and marine life can be placed for observation under variant conditions of pressure. To illustrate, if portion 11′ is 760 millimeters long and is filled with mercury with bubble 8′ disposed at the base extremity and neck portion 12′ is charged full with an aquatic sample and stopcock 14′ is then closed, the sample will be under atmospheric pressure, i.e, one atmosphere absolute pressure. Bubble 8′ being at the base of apparatus 10′ is subject to the hydrostatic head of the sample plus the mercury which latter component for 760 millimeters at sea level is equal to an atmosphere of pressure. The volume of bubble 8′ under such conditions will remain invariable anywhere in neck portion 11′, assuming the compressibility of water and mercury to be negligible, and only the relative elevation of bubble 8′ will be noted during use and not the dimension of the bubble. However, as bubble 8′ is moved operably to the top of the mercury column the fluid pressure on the water sample will have increased by one atmosphere pressure because the bubble which at the bottom of the apparatus was equilibrated with its surroundings at two atmospheres (plus the hydrostatic head of the water sample) absolute pressure and which has not changed volume in traversing the bore of the apparatus and ascending in the mercury column necessarily will still exert two atmospheres (plus the hydrostatic head of the water sample) absolute pressure and the water sample with which it is equilibriated in pressure and underlies will be subject to two atmospheres absolute pressure, an increase of one atmosphere compared to the pressure at which it is charged to apparatus 10′. Obviously, samples may be charged at any other pressure such as if taken at depths in the ocean and portion 11′ may be of any other length to provide a range of pressure variance of different magnitude. Incremental pressures of less than the difference produced by moving bubble 8′ to its extremes of relative elevation may be produced by providing any desired number of crenels in portion 11′ and causing bubble 8′ to repose in any crenel by operable manipulation of apparatus 10′ as described. Fluid other than mercury can be provided in portion 11′ including the sample fluid.

Figure 3:
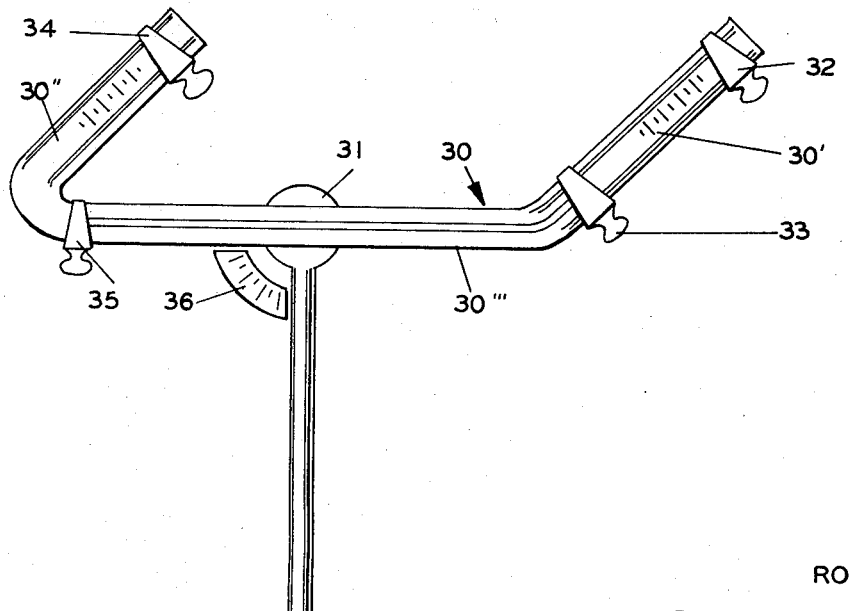
FIG. 3 is an elevation of an apparatus for determining component fractions of gasoline ingredients.

In FIG. 3 is shown another embodiment of this invention comprising apparatus 30 rotatably mounted about pivot 31. End-most portions 30′, 30″ of apparatus 30 are calibrated, and are disposed at angles of inclination to center-most portion 30‴, end-most portion 30′ forming an obtuse angle therewith and end-most portion 30″ forming an acute angle. A continuous bore is provided through the apparatus and is fitted with stopcocks 32, 33, 34, 35 disposed respectively at the outer end extremity and inner end extremity of endmost portion 30′ and at the outer end extremity of endmost portion 30″ and in the center-most portion 30‴ adjacent the inner-end extremity of portion 30″. In use, apparatus 30 is oriented for filling with center-most portion 30‴ in horizontal position and mercury is poured into the apparatus through end-most portion 30′ with all stopcocks open. The mercury will rest at equal elevation in the inward ends of portions 30′ and 30″. Stopcock 34 is closed and a sample of volatile liquid to be analyzed, for example, gasoline, is charged to portion 30′. Stopcock 32 is then closed and the apparatus is rotated incrementally about pivot 31 until center-most portion 30‴ is ultimately in vertical position with endmost portion 30′ disposed at higher elevation. As the apparatus is rotated, simultaneous readings of scale 36 are made showing the angular inclination of the apparatus and of the calibration marks on the wall of portion 30′ or 30″ showing the volume of the gaseous space therein. When the horizontal mercury column is 760 millimeters long, the increment in pressure in portion 30″ resulting from rotating the column to vertical will be one atmosphere. The component of total pressure attributable to the hydrostatic head in apparatus 30 is a known quantity: the differential volumes of air in portion 30″ or of vapor in portion 30′ are parametric measures of the component of the total pressure in apparatus 30 attributable to the vapor pressure of the sample, which for like sample materials such as gasoline which comprise like volatile components such as butane enable calibrations on the wall of portions 30′ or 30″ to read directly in component fractions of volatile material in the sample.

While a variety of means and uses for embodiments of this invention have been described, it will be understood that a large variety of other expedients will be apparent for providing and utilizing precisely controllable and determinable positive or negative pressure environments in constant volume apparatus wherein the relative elevations of two fluid phases can be adjusted and varied to effect internal pressure change.

I claim:

1. Apparatus for containing liquid state and gaseous state fluids at constant total volume to provide controlled, variable, equilibriated fluid pressure environment comprising in combination a rigid walled vessel comprising a cavity for receiving liquid state and gaseous state fluids, means for sealing said vessel, means for controlling the relative elevation of gaseous state fluid within said vessel with respect to liquid state fluid within said vessel within which vessel said gaseous state fluid and said liquid state fluid are substantially confined and equilibriated in temperature and pressure, means for determining the relative elevation of said gaseous state fluid with respect to said liquid state fluid and parametrically determining the volume thereof.

2. The apparatus of claim 1 wherein said means for controlling the relative elevation of gaseous state fluid with respect to liquid state fluid comprises a continuous passage communicating a lower elevation within said apparatus with a higher elevation within said apparatus wherein said passage is configured and disposed relative to vertical to comprise at least one intermediate elevation which is greater than in contiguous portions of said passage, and means for rotating said apparatus to shift said intermediate elevation which is greater than in contiguous portions of said passage along the length of said passage.

3. The apparatus of claim 2 wherein said passage is substantially helical about an axis inclined to vertical.

4. The apparatus of claim 1 comprising means for controlling the relative elevation of gaseous state fluid within said vessel relative to liquid state fluid within said vessel which embody an axis of rotation other than vertical about which said apparatus can be rotatably moved.

5. The apparatus of claim 1 comprising a substantially impermeable membrane disposed at the interface of said gaseous state fluid and said liquid state fluid.

6. A method for determining the vapor pressure of a volatile fluid comprising the steps of charging to a substantially constant volume vessel gaseous state matter and liquid state matter comprising a volatile liquid, equilibriating fluid pressure between said gaseous state matter and said liquid state matter without effecting mass transfer therebetween, sealing said vessel, causing the relative elevation of said gaseous state matter to be varied with respect to said liquid state matter, measuring the volume differential of said gaseous state matter at a plurality of said relative elevations, determining vapor pressure as the component of pressure in addition to hydrostatic pressure which equates to the pressure differential corresponding to said measured volume differential.

7. The method of claim 6 wherein said vapor pressure is recorded as a proportion of a known component in said volatile liquid.

References Cited

UNITED STATES PATENTS

| | | | |
|---|---|---|---|
| 1,318,362 | 10/1919 | Davis | 73—29 |
| 2,384,159 | 9/1945 | Cuyler et al. | 73—401 X |
| 2,509,327 | 5/1950 | Young | 73—401 |
| 3,026,187 | 3/1962 | Robertson | 23—259 X |
| 3,195,346 | 7/1965 | Ehrmantraut et al. | 73—401 X |
| 3,298,234 | 1/1967 | Goldman | 73—401 |

LOUIS R. PRINCE, Primary Examiner

J. W. ROSKOS, Assistant Examiner

U.S. Cl. X.R.

23—259; 73—29, 401